(12) United States Patent
Seethaler et al.

(10) Patent No.: US 8,996,901 B2
(45) Date of Patent: Mar. 31, 2015

(54) POWER MANAGEMENT OF ELECTRONIC DEVICE WITH DISPLAY

(75) Inventors: Kenneth Scott Seethaler, Wake Forest, NC (US); Howard Locker, Cary, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 567 days.

(21) Appl. No.: 12/751,958

(22) Filed: Mar. 31, 2010

(65) Prior Publication Data

US 2011/0246801 A1 Oct. 6, 2011

(51) Int. Cl.
*G06F 1/32* (2006.01)
*G06F 1/26* (2006.01)
*G09G 5/00* (2006.01)

(52) U.S. Cl.
CPC .. *G06F 1/26* (2013.01); *G06F 1/32* (2013.01); *G06F 1/3218* (2013.01); *G06F 1/3265* (2013.01); *G09G 5/00* (2013.01)
USPC .............................. 713/323; 713/320; 713/324

(58) Field of Classification Search
CPC ....... G06F 1/32; G06F 1/3203; G06F 1/3206; G06F 1/3218; G06F 1/3228; G06F 1/3265; Y02B 60/1242
See application file for complete search history.

(56) References Cited

U.S. PATENT DOCUMENTS

| | | | |
|---|---|---|---|
| 7,580,033 B2 * | 8/2009 | Plut ................................ | 345/211 |
| 7,614,011 B2 * | 11/2009 | Karidis et al. ................. | 715/789 |
| 2009/0322969 A1 * | 12/2009 | Unger ............................ | 348/790 |
| 2010/0277511 A1 * | 11/2010 | Karaoguz et al. ............. | 345/690 |
| 2011/0084979 A1 * | 4/2011 | Rutman et al. ................ | 345/589 |

* cited by examiner

*Primary Examiner* — Dennis M Butler
(74) *Attorney, Agent, or Firm* — Kunzler Law Group

(57) ABSTRACT

An electronic device, such as an e-book, for displaying information includes a power source; a display having a high power mode and a low power mode, said display being powered by said power source; and a power control arrangement for switching the display to a low power mode when no changes to selected regions of the display are required for at least a predetermined time. The power control arrangement switches said display from said low power mode to said high power mode when changes of said display are required in display portions other than said selected portions. A method for operating the electronic device. A computer readable medium having computer readable instructions thereon for implementing the method.

19 Claims, 3 Drawing Sheets

POWER MANAGEMENT OF ELECTRONIC DEVICE WITH DISPLAY

BACKGROUND

The subject matter presented herein relates to apparatus and methods for displaying information. More particularly, it relates to those apparatus and methods for power management in displays of electronic devices generally and in electronic books or e-books, specifically.

Traditionally, e-books have differed from computers in that e-books run in low power mode due to their black and white static screens run by low power microcontrollers. Their screen technology only uses power on change, and books are static so they do not need to change often (for example, once every 30 seconds or so is adequate).

However, the present inventors have recognized herein that as the e-book product category matures in function, higher end (and higher power) features will be added that support markups, multimedia and other direct user input. These features will require a higher featured operating system and graphics controllers and higher power LCD screens with high refresh rates than previously needed for e-books. Problems will arise when e-books spend too much time in the higher power mode. Usable reading time after charging of the internal battery may be drastically reduced.

SUMMARY

Thus, what is described herein is an electronic device comprising a power source; a display having a high power mode and a low power mode, the display being powered by the power source; and a power controller which switches the device to a low power mode in response to no changes being indicated for one or more first selected regions of the display for at least a predetermined time, wherein the area of said one or more first selected regions is less than the area of the display. The power controller can switch the display from the low power mode to the high power mode in response to changes to the display being indicated in display portions other than the one or more first selected regions.

In the low power mode, the display can be static, and is not refreshed. The predetermined time can be between fractions of a second and sixty seconds.

The electronic device can have a region selection mode, wherein one or more second regions of the display are selected so that changes in the second regions do not change the mode of the display from a low power mode to a high power mode. The one or more of the second regions that are selected can be a region for the display of a specific icon. The icon can be selected from the group consisting of a clock icon and a status icon. The electronic can have a monitoring mode wherein changes in the second selected regions of the display do not switch the display from a low power mode to a high power mode. Change in regions of the display other than the second selected regions of the display can switch the display from a low power mode to a high power mode.

The electronic device can be configured as an electronic book.

Also described herein is a method comprising providing an electronic device including a display having a high power mode and a low power mode; wherein a switching of the device to a low power mode occurs when no changes to one or more first selected regions of the display are indicated for at least a predetermined time wherein the area of said one or more first selected regions is less than the area of the display.

The switching of the display from the low power mode to the high power mode can occur when changes of the display are indicated in display portions other than the one or more first selected regions. In the low power mode, the display can be static, and is not refreshed. The predetermined time can be, for example, between a fraction of a second and sixty seconds. The method can further comprise placing the device in a region selection mode wherein second regions of the display are selected so that changes in the second regions do not change the mode of the display from a low power mode to a high power mode.

A region of the second regions that are selected can be a region for the display of a specific icon. The icon can be selected from the group of a clock icon and a status icon.

The method can further comprise placing the device in a monitoring mode wherein changes in the second selected regions of the display do not switch the display from a low power mode to a high power mode. Change in regions of the display other than the second selected regions of the display can switch the display from a low power mode to a high power mode.

Also described herein is an electronic device comprising a power source; a display memory; a display for displaying contents of the display memory, the display defaulting to a low power mode during ordinary use, and having a high power mode, the display being powered by the power source; and a power controller which switches the device to a high power mode in response to changes being indicated in the display memory.

Also disclosed is a computer storage medium having computer readable code stored thereon for execution by an electronic device including a display having a high power mode and a low power mode, so as to switch the display to a low power mode when no changes to one or more selected regions of the display are indicated for at least a predetermined time.

BRIEF DESCRIPTION OF THE DRAWINGS

The foregoing aspects and other features of the present embodiments are explained in the following description, taken in connection with the accompanying drawings, wherein.

DETAILED DESCRIPTION

As an overview, it is assumed that an e-book device can detect when it needs to move from the low power "e-book mode" into "full OS" (full operating system) mode. Full OS mode is used to enable higher end graphics features such as pen input and can include other graphics operations such as video, system status notifications, etc. The graphics subsystem can quickly notify the e-book power management engine that it is complete with the operations by monitoring the contents of the frame buffer that is being displayed to the e-book at any given time. When no changes have occurred within a predetermined time, the power management control is signaled to go back into low power e-book mode. In accordance with a further aspect, specific areas within the screen boundaries of the "full OS" mode that are not critical regions are identified. These regions can be just status icons, or the clock or other low priority pieces of information. Changes are allowed in the frame buffer for these areas but do not drive the device to "full OS" mode.

Figure 1:
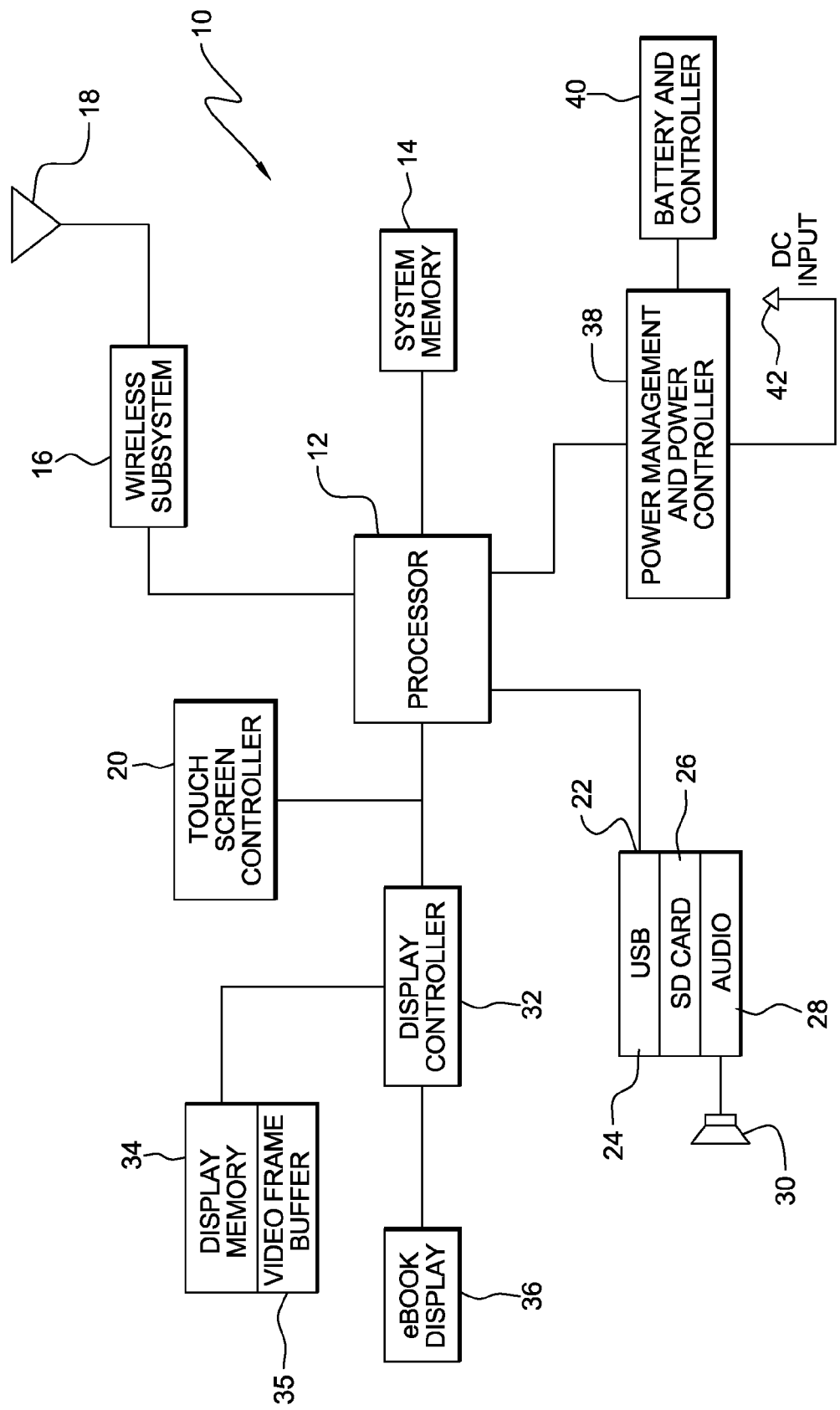
FIG. 1 depicts a non-limiting example of e-book according to an embodiment.

Referring to FIG. 1, there is shown a block diagram of a non-limiting example of e-book 10. Although a single embodiment is shown in the drawings, it should be understood that there can be many alternate forms and embodiments. In addition, any suitable size, shape or type of elements or materials could be used.

E-book 10 is operated under the control of a processor 12 connected to a system memory 14, which may store therein an operating system and appropriate software for permitting operation of the various other components of e-book 10 as described below. Processor 12 may also be connected to a wireless subsystem 16, having an antenna element 18 for permitting e-book 10 to interface with a network, such as the internet or a 3G wireless network so that data, including books to be stored and eventually read by using e-book 10, may be received by e-book 10.

Processor 12 may also be connected to a touchscreen controller 20 so that appropriate user inputs may be provided to facilitate the operation of e-book 10. Processor 12 may also be connected to an input/output block 22 including a USB interface 24, an SD card slot 26, and an audio output 28 for, for example, a headphone 30. A display controller 32 is connected to processor 12. Display controller 32 is connected to a display memory 34, which provides input for what is displayed on an e-book display 36. Display memory 34 includes a video frame buffer 35.

E-book 10 is powered by power management and power controller block 38, which receives power from a battery and controller block 40. Generally, a power adapter (not shown), of a type well know in the art, plugs into a 120 or 240 volt power outlet in a home or office, and supplies suitable direct current input to a jack 42 to charge a battery associated with block 40.

Figure 2:
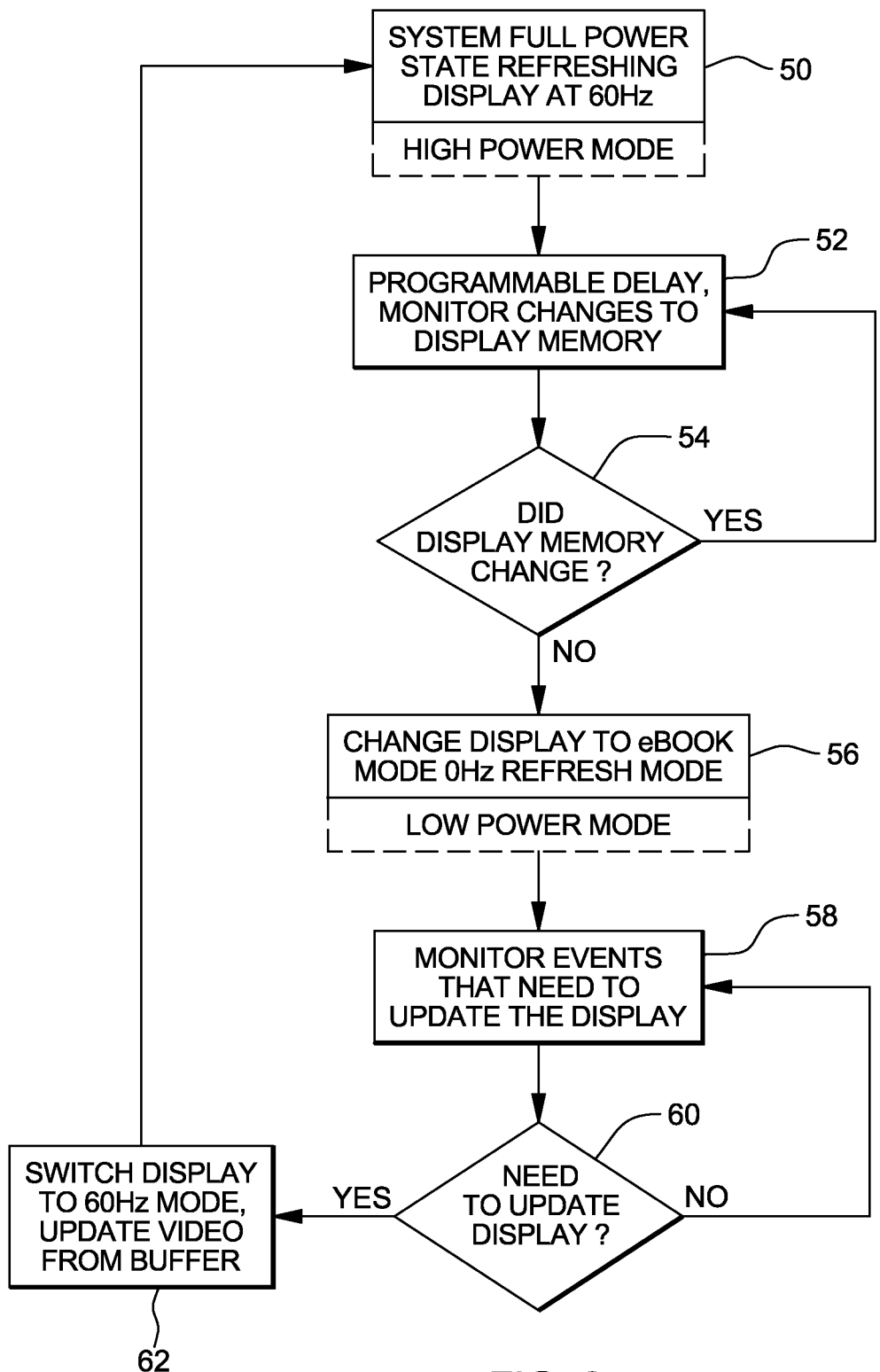
FIG. 2 is a flow chart of the operation of the e-book of FIG. 1.

Referring to the flow chart of FIG. 2, at block 50, power management and power controller block 38, is in a full power state, wherein display 36 may be refreshed at a high rate, such as 60 times per second (60 Hz). At this time, display events may be occurring very rapidly. At block 52, monitoring of display memory 34 is conducted for a programmable period of time. By way of example and not by way of limitation the predetermined time can be between a fraction of a second and sixty seconds. At 54, if there have been changes to the content of the video frame buffer 35 of display memory 34, the programmable period of time specified by block 52 is restarted. If at 54, there have been no changes to the content of the video frame buffer 35 of display memory 34, then, at 56, power management and power controller block 38 switches e-book 10 to a low power mode where the refresh rate for e-book display 36 is dropped to 0 Hz (in other words, the display is static), taking advantage of the very low power required when the e-book display is in this mode. It will be understood that most e-books use displays 36 of this kind so that battery life, when simply reading a book, is enhanced. Thus, if no changes are indicated (defined as required changes, detected changes, made changes, queued changes, or a determination that changes must be made) for the predetermined period of time, the transition is made.

At 58, events that require e-book display 36 to be updated are monitored. These events can be those associated with a change in the video frame buffer that requires a screen update, as described below, or other events such as, for example, a low battery alarm, the operation of the touchscreen, or a signal indicating that a file for a new book is being downloaded or has completed downloading. At 60, a determination is made as to whether one of those events has occurred. If not, monitoring continues at 58. If one of those events has occurred, such as the need for a change in contents for display, then at 62, e-book display 36 is switched to the high power mode wherein it is refreshed at 60 Hz. For example, this could be due to the video frame buffer of display memory 34 being updated in other than certain limited ways, as described below.

Figure 3:
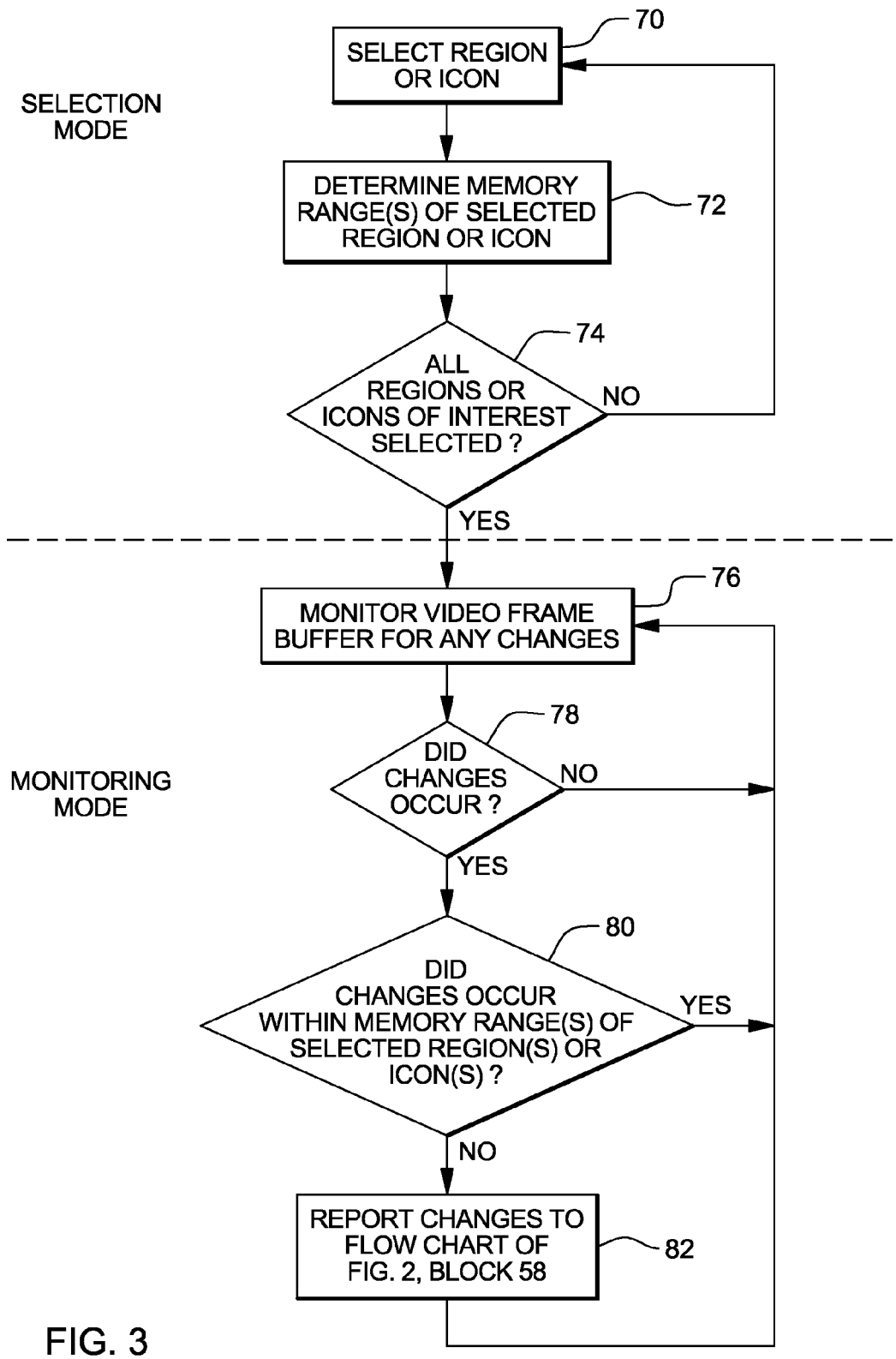
FIG. 3 is an additional flow chart of the operation of the e-book of FIG. 1.

Referring to FIG. 3, there is illustrated the manner in which a selection is made as to which changes in the video frame buffer 35 of display memory 34 are significant in terms of changing the display mode of e-book display 36 from a low power mode to a high power mode. At block 70, a selection is made as to a portion of the display 36 (selected by moving a cursor in a closed path or by selecting a particular icon) which portion can undergo changes without switching display 36 to the high power display mode. These areas might be just status icons, or the clock or other areas of the display that show low priority pieces of information.

At 72, a determination is made as to the memory ranges in the video frame buffer 35 of display memory 34 that are associated with the region or icon selected at 70. At 74, a decision is made as to whether all regions or icons of the display 36 have been selected, that are of interest for not changing the mode of display 36 when the information to be displayed is changed. If additional regions or icons are to be changed, then branching to block 70 occurs. If no additional regions or icons are to be selected, then they system is caused to transition from a region or icon selection mode to a monitoring mode at 76, wherein the video frame buffer is monitored for any changes. It should be noted that icons and regions are not synonymous; for example, a region may contain one or more icons or gadgets therein, or individual icons or gadgets may be selected. The terms icons and regions are to be given their plan and ordinary meanings.

If there are no changes detected at 78, then monitoring continues at 76. If there are changes at 78, then at 80, a determination is made as to whether the changes occurred in the memory ranges of video frame buffer 35 of display memory 34 associated with the regions or icons of display 36 which were selected in the selection mode of blocks 70, 72 and 74. If the changes in video frame buffer 35 of display memory 34 were in the selected memory range(s), then branching to block 76 occurs, and there is no change in the display mode from the low power mode to the high power mode of display 36. If the changes in video frame buffer 35 of display memory 34 were not in the selected memory range(s), then branching to block 82 occurs. A report is sent to block 58 of FIG. 2 indicating that a significant change in the video frame buffer 35 of display memory 34 has occurred, thus changing the display mode from the low power mode to the high power mode of display 36.

In view of the above, it will be understood that changes are allowed in the frame buffer only for certain regions of the display, or certain icons thereon that do not drive the e-book display into a "full OS" mode. However, if a user of the e-book wishes to be certain that the latest information is displayed by, for example, icons that have been selected so that changes do not update the display, (a specific example could be the time on a clock icon) it is only necessary for the user to perform an operation that changes a portion of the display that has not been so selected, such as, for example, but not by way of limitation, moving the screen cursor to a region or an icon that has not been selected. This will cause a change in video frame buffer 35 of display memory 34 which will be in a memory location that is not inhibited from causing a change in the power state of display 36, and the of display mode of display 36 will move to a high frequency of update, thus providing the latest information (such as the current time on a clock icon).

The operation shown in FIG. 2 and FIG. 3 can be implemented in hardware or software. In one embodiment, the contents of the video frame buffer can be monitored by hardware configured accordingly. When implemented in hardware, the monitoring and other functions shown in FIG. 2 and FIG. 3 can occur very quickly without any software dependency, minimizing the latency period required to go into low power mode, and thus enhancing battery life. However, the technology described herein can also be implemented in software. In that regard, the required program instructions can be stored on a computer storage medium that can be connected to the e-book via an internal bus. This bus can connect the processor to an on board ROM or other storage medium from where the instructions can be stored and executed.

There are at least two embodiments wherein the device can be placed in a low power mode. In one embodiment, power management and power controller 38 places at least the graphics subsystem into the low power mode from a high power mode. In another embodiment, power management and power controller 38 places all subsystems which are not required to come out of low power mode into a low power mode to further reduce power consumption. By way of a non-limiting example, power management and power controller 38 can place into a low power mode processor 12, system memory 14, wireless subsystem 16, and input/output block 22 in addition to the graphics subsystem which comprises at least display controller 32, display memory 34, video frame buffer 35, and eBook display 36.

It should be understood that the foregoing description is only illustrative. Various alternatives and modifications can be devised by those skilled in the art. Accordingly, the present invention is intended to embrace all such alternatives, modifications and variances which fall within the scope of the appended claims.

What is claimed is:

1. An electronic device comprising:
a power source;
a display having a high power mode and a low power mode, said display being powered by said power source; and
a power controller which switches all regions of said display to a low power mode in response to no changes being indicated for one or more first selected regions of said display for at least a predetermined time, wherein the area of said one or more first selected regions is less than the area of said display, wherein in said low power mode, said display is static, and is not refreshed.

2. The electronic device of claim 1, wherein said power controller switches said display from said low power mode to said high power mode in response to changes to said display being indicated in display portions other than said one or more first selected regions.

3. The electronic device of claim 1, wherein said predetermined time is between fractions of a second and sixty seconds.

4. The electronic device of claim 1, wherein one or more second regions of said display are selected in a region selection mode so that changes in said second regions do not change the mode of said display from a low power mode to a high power mode.

5. The electronic device of claim 4, wherein the one or more of said second regions that are selected is a region for the display of a specific icon.

6. The electronic device of claim 5, wherein said icon is selected from the group consisting of a clock icon and a status icon.

7. The electronic device of claim 4, further having a monitoring mode wherein changes in said second selected regions of said display do not switch said display from a low power mode to a high power mode.

8. The electronic device of claim 7, wherein change in regions of said display other than said second selected regions of said display switch the display from a low power mode to a high power mode.

9. The electronic device of claim 1, configured as an electronic book.

10. A method comprising:
providing an electronic device including a display having a high power mode and a low power mode; and
switching, by use of a processor, all regions of said display to a low power mode occurs when no changes to one or more first selected regions of said display are indicated for at least a predetermined time, wherein the area of said one or more first selected regions is less than the area of said display, wherein in said low power mode, said display is static, and is not refreshed.

11. The method of claim 10, further comprising switching said display from said low power mode to said high power mode when changes of said display are indicated in display portions other than said one or more first selected regions.

12. The method of claim 10, wherein said predetermined time is between a fraction of a second and sixty seconds.

13. The method of claim 10, further comprising placing said device in a region selection mode wherein second regions of said display are selected so that changes in said second regions do not change the mode of said display from a low power mode to a high power mode.

14. The method of claim 13, wherein a region of said second regions that are selected is a region for the display of a specific icon.

15. The method of claim 14, wherein said icon is selected from the group of a clock icon and a status icon.

16. The method of claim 13, further comprising placing said device in a monitoring mode wherein changes in said second selected regions of said display do not switch said display from a low power mode to a high power mode.

17. The method of claim 16, wherein change in regions of said display other than said second selected regions of said display switch said display from a low power mode to a high power mode.

18. An electronic device comprising:
a power source;
a display memory;
a display for displaying contents of said display memory, said display defaulting to a low power mode during ordinary use, and having a high power mode, said display being powered by said power source; and
a power controller which switches the device to a high power mode in response to changes being indicated in second selected regions of said display and not switching from the low power mode in response to changes in first selected regions of said display, wherein in said low power mode, said display is static, and is not refreshed.

19. A computer storage medium having computer readable code stored thereon for execution by an electronic device including a display having a high power mode and a low power mode, so as to switch all regions of said display to a low power mode when no changes to one or more selected regions of said display are indicated for at least a predetermined time, wherein in said low power mode, said display is static, and is not refreshed.

* * * * *